United States Patent
Ponnapalli et al.

(10) Patent No.: US 7,861,076 B2
(45) Date of Patent: Dec. 28, 2010

(54) USING AUTHENTICATION SERVER ACCOUNTING TO CREATE A COMMON SECURITY DATABASE

(75) Inventors: Ramesh V N Ponnapalli, New Tippasandra (IN); Vandateshwar Pullela, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1077 days.

(21) Appl. No.: 11/020,754

(22) Filed: Dec. 27, 2004

(65) Prior Publication Data

US 2006/0143440 A1 Jun. 29, 2006

(51) Int. Cl.
*H04L 9/00* (2006.01)

(52) U.S. Cl. ............... 713/155; 713/151; 713/168; 726/1; 726/2; 726/3; 726/4; 380/270; 455/404.2; 455/411; 70/221; 70/224; 70/225; 70/229; 370/338

(58) Field of Classification Search ............ 713/151, 713/155, 168; 726/1, 2, 3, 4, 5, 6, 7, 8, 26, 726/27; 455/404.2, 411; 709/221, 224, 225
See application file for complete search history.

(56) References Cited

U.S. PATENT DOCUMENTS

| | | | | |
|---|---|---|---|---|
| 6,011,910 A * | 1/2000 | Chau et al. | ........... | 709/229 |
| 6,233,616 B1 * | 5/2001 | Reid | ........... | 709/225 |
| 6,298,383 B1 * | 10/2001 | Gutman et al. | ........... | 709/229 |
| 6,311,275 B1 * | 10/2001 | Jin et al. | ........... | 726/1 |
| 6,411,807 B1 * | 6/2002 | Amin et al. | ........... | 455/432.3 |
| 6,466,571 B1 * | 10/2002 | Dynarski et al. | ........... | 370/352 |
| 6,678,826 B1 * | 1/2004 | Kelly et al. | ........... | 726/2 |
| 6,700,891 B1 * | 3/2004 | Wong | ........... | 370/401 |
| 6,895,434 B1 * | 5/2005 | Chandrupatla et al. | ........... | 709/223 |
| 7,099,475 B2 * | 8/2006 | Huff et al. | ........... | 380/270 |
| 7,117,528 B1 * | 10/2006 | Hyman et al. | ........... | 726/5 |
| 7,210,163 B2 * | 4/2007 | Stoll | ........... | 726/2 |
| 7,304,974 B2 * | 12/2007 | Yang et al. | ........... | 370/338 |
| 7,398,310 B1 * | 7/2008 | Kuehl et al. | ........... | 709/224 |
| 7,443,824 B1 * | 10/2008 | Lipford et al. | ........... | 370/338 |
| 7,562,384 B1 * | 7/2009 | Huang | ........... | 726/5 |
| 7,577,837 B1 * | 8/2009 | Ithal et al. | ........... | 713/163 |
| 7,724,728 B2 * | 5/2010 | Pullela et al. | ........... | 370/352 |
| 2001/0037466 A1 * | 11/2001 | Fukutake et al. | ........... | 713/201 |
| 2003/0131264 A1 * | 7/2003 | Huff et al. | ........... | 713/202 |
| 2005/0144320 A1 * | 6/2005 | Jagana et al. | ........... | 709/245 |
| 2005/0237983 A1 * | 10/2005 | Khalil et al. | ........... | 370/338 |

OTHER PUBLICATIONS

"Request for Comments: 2865", C. Rigney et al, Network Working Group, pp. 1-76, Jun. 2000.*

"Remote Authentication Dial-In User Service (RADIUS)", Newsletter, Dax Networks, pp. 1-4, 2003.*

(Continued)

*Primary Examiner*—Nasser Moazzami
*Assistant Examiner*—Shanto M Abedin
(74) *Attorney, Agent, or Firm*—Tucker Ellis & West LLP

(57) ABSTRACT

A common security database is maintained by a RADIUS server based on the attributes the RADIUS server receives through accounting packets. When the common security database has conflicting entries, for example a MAC address and/or IP address appearing at two different network devices such as switches or routers, the RADIUS server can notify the associated network access devices to take corrective action.

12 Claims, 4 Drawing Sheets

OTHER PUBLICATIONS

"IBM and Cisco Deliver Identity-Based Networking Services", pp. 1-6, IBM Corporation, 2004.*

"Request for Comments: 3576", M. Chiba et al, pp. 1-29, Network Working Group, Jul. 2003.*

"Request for Comments: 2138", C. Rigney et al, pp. 1-56, Network Working Group, Apr. 1997.*

IBM and Cisco Deliver, Identity-Based Networking Services, IBM and Cisco: Next Generation e-business Solutions.

* cited by examiner

USING AUTHENTICATION SERVER ACCOUNTING TO CREATE A COMMON SECURITY DATABASE

CROSS-REFERENCE TO RELATED APPLICATIONS

This application is related to U.S. application Ser. No. 11/000,629, filed on Dec. 1, 2004.

BACKGROUND OF THE INVENTION

The present invention relates generally to network security for wired and wireless local area networks, and more particularly to detecting and/or preventing spoof attacks.

Identity Based Networking is an integrated solution combining several technologies that offer authentication, access control, and user policies to secure network connectivity and resources. Using technologies such as IEEE 802.1X and AAA (such as Radius), identity based networking provides the ability to create user or group profiles with policies that define trust relationships between users and network resources that allows organizations to easily authenticate, authorize, and account for all users of wired or wireless networks. Identity based networking enables securing network connectivity and resources because policies are associated with users and not physical ports, users obtain more mobility and freedom, and IT administration is simplified. Using the Wireless Local Area Network (WLAN) Mobility System, users can log in once and retain their access privileges and policies while they physically roam across the network. IT administrators can provide this capability without having to modify their network backbones, clients, or protocols.

Security methods have been developed to prevent spoofing of MAC addresses, IP addresses and user identities. Usually, security methods attempt to enforce some kind of binding. For example, 802.1x binds a user identity to a port and DHCP-Snooping/ARP inspection enforces MAC-IP Port bindings. PortSecurity can enforce MAC-Port bindings. IP Source Guard can achieve can achieve port-IP bindings, etc. However, to enforce these bindings, these features have to be enabled. But even if enabled, these methods are capable of detecting spoofs only within a device, e.g., switch or access point (AP). A shortcoming of these methods is that they cannot enforce MAC-IP-Port Device-User Identity bindings across a network. Thus, what is needed is an effective technique to enforce unique bindings to effectively prevent spoof attacks, e.g., MAC and IP spoof attacks, and identity theft across the network.

BRIEF SUMMARY OF THE INVENTION

In accordance with an aspect of the present invention, the present invention in a preferred embodiment contemplates a common security database that is maintained by an authentication server, based on the attributes that the authentication server (e.g., a RADIUS server) receives through accounting packets. When the common security database has conflicting entries e.g., a MAC address and/or IP address appearing at two different network devices such as switches or routers), the authentication server can notify the associated network access devices to take corrective action.

In accordance with an aspect of the present invention, there is described herein a system for providing network security for a network having a plurality of network access devices, an authentication server communicatively coupled to the plurality of network access devices, and a common security database coupled to the authentication server. The network access devices are responsive to requests from users to access the network to obtain parameters from the user and send the parameters to the authentication server. The authentication server is responsive to receipt of the parameters from the plurality of network access devices to store the parameters in the common security database, wherein the parameters are at least one of username, network access service internet protocol address, network access service port, framed internet protocol address, calling station identifier and network access service port type.

In a preferred embodiment the authentication server is a RADIUS server. The RADIUS server is configured to detect a conflicting entry in the common security database, and to send a message to a one of the plurality of network access devices coupled to a user associated with the conflicting entry. The message is at least one of a disconnect request and a change of authorization. A conflicting entry is detected when at least one of the group consisting of username, calling station identifier and framed internet protocol address is associated with more than one of the plurality of network access devices. Alternatively, when the network access service port type for a user is indicative of a wired connection, the authentication server is configured to detect a conflicting entry for any entry indicative of the user roaming.

In accordance with another aspect of the present invention, there is described herein a method for providing network security using a centralized common security database. The method comprising obtaining connection parameters for a user accessing the network from a network access device communicatively coupled to the centralized common security database, and searching the centralized common security database for a conflicting entry. The connection parameters are at least one of username, network access service internet protocol address, network access service port, framed internet protocol address, calling station identifier and network access service port type.

In a preferred embodiment, when a conflicting entry is detected, a message is sent to a network access device coupled to a user associated with the conflicting entry. In one embodiment, the message is a disconnect request. In an alternative embodiment, the message is a change of authorization In accordance with another aspect of the present invention, there is described herein a computer-readable medium of instructions for implementing a method of the present invention. The term "computer-readable medium" as used herein refers to any medium that participates in providing instructions to a processor for execution.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
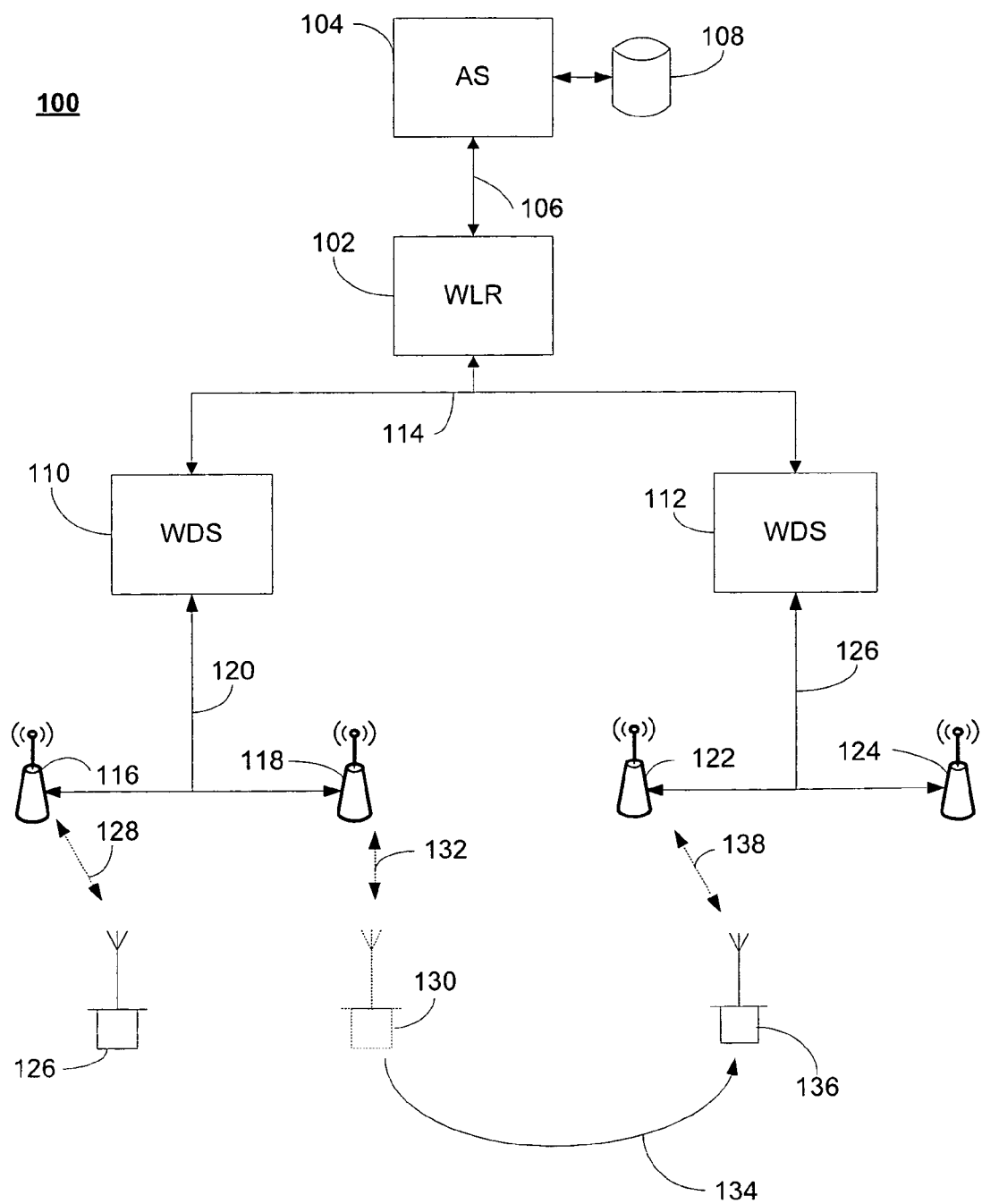
FIG. 1 is a block diagram of a system configured in accordance with an aspect of the present invention.

Throughout this description, the preferred embodiment and examples shown should be considered as exemplars, rather than limitations, of the present invention.

Network devices that support RADIUS Accounting (Remote Authentication Dial-In User Service (RFC 2865)), such as a Network Access Service (NAS), send complete information about authenticated users to the RADIUS server, which can use the information for logging or billing information. A RADIUS server maintains a single "database" of users, which allows for authentication (verifying user name and password) as well as configuration information detailing the type of service to deliver to the user (for example, SLIP, PPP, telnet, rlogin).

When a device wants to access the network, it must establish a session with an Infrastructure Node on the network. As used herein, an infrastructure node (IN) includes, but is not limited to a router, switch, Work-group Bridge (WGB), repeater AP, root AP, Wireless Domain Server (WDS) or a Wireless Location Register (WLR). Each infrastructure node comprises logic for performing the functions described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

For networks employing a RADIUS accounting server as an authentication server (AS), an infrastructure node functions as a Network Access Server. A Network Access Server (NAS) operates as a client of the RADIUS accounting server. The client is responsible for passing user accounting information to a designated RADIUS accounting server. The RADIUS accounting server is responsible for receiving the accounting request and returning a response to the client indicating that it has successfully received the request. The RADIUS accounting server can act as a proxy client to other kinds of accounting servers. Transactions between the client and RADIUS accounting server are authenticated through the use of a shared secret, which is never sent over the network.

When a client is configured to use RADIUS Accounting, at the start of service delivery it will generate an Accounting Start packet describing the type of service being delivered and the user it is being delivered to, and will send that to the RADIUS Accounting server, which will send back an acknowledgement that the packet has been received. At the end of service delivery the client will generate an lo Accounting Stop packet describing the type of service that was delivered and optionally statistics such as elapsed time, input and output octets, or input and output packets. It will send that to the RADIUS Accounting server, which will send back an acknowledgement that the packet has been received. Typically, the information sent in RADIUS accounting includes:

1) MAC (Calling Station ID);
2) IP address;
3) Port (physical port address);
4) Location (for example using NAS IP determining the device the point of connection);
5) Username (user identity); and
6) VLAN (optional).

In accordance with an aspect of the present invention, the RADIUS server maintains a common security database using the attributes received through accounting packets. The database entries can include, but are not limited to MAC address, IP address, Location (Port and/or device), and/or user identity. The database entries can have partial entries depending on which security features are turned on at the network device. In accordance with a preferred embodiment, the data for the database entries is obtained from RADIUS accounting packets.

If the database has conflicting entries, for example a MAC and/or an IP address appearing at two different switches and/or routers, the RADIUS server can take corrective action by sending messages to the Network Access Devices (see for example RFC 3576 for a method to enable push support for RADIUS server).

FIG. 1 is a block diagram of a system 100 configured in accordance with an aspect of the present invention. The system has a wireless location register (WLR) 102 functioning as a root node. Authentication server (AS) 104 is coupled to WLR 102 along path 106. Path 106 is suitably any wired or wireless topology, or a combination thereof, preferably secured. In a preferred embodiment, authentication server 104 is a RADIUS server. A centralized common security database 108 is coupled to authentication server 104. Wireless domain server (WDS) 110 and WDS 112 are coupled via a backbone network 114 to WLR 102. Backbone network 114 is suitably any wired or wireless topology, or a combination of wired and wireless topologies, and is preferably a secured network. The number of wireless domain servers than can be coupled to WLR 102 varies in accordance with the size of network 100, and should not be construed as limited to two as shown.

Access point (AP) 128 and AP 132 are coupled via a network 120 to WDS 110. Similarly AP 122 and AP 124 are coupled to WDS 112 on network 126. Network 120 and 126 are suitably any wired or wireless network topology, preferably secured.

As illustrated, wireless station 126 is accessing network 100 via AP 116 as indicated by bidirectional arrow 128. Wireless station 130 is initially accessing network 100 via AP 132 as shown by bidirectional arrow 132 and subsequently roams along path 134 to location 136 where it then accesses network 100 via AP 122 as indicated by bidirectional arrow 138.

Although the example illustrated in example 1 illustrates a WLR 102 as the root node, those skilled in the art can readily appreciate that alternative configurations are suitably adaptable to the present invention. For example, for smaller networks, a WDS can function as the root node, in which case the authentication server is coupled to the WDS instead of a WLR. Furthermore, the number of access points in network 100 varies in accordance with the size of network 100 and should not be construed as limited to the number access points shown in the example of FIG. 1.

In operation, access points 116, 118, 122 and 124 function as network access devices (e.g., provide network access service) responsive to requests from users to access network 100.

When a host, such as wireless station 126 or wireless station 130 attempt to access the network, the access point, or infrastructure node, that the host is communicating with obtains parameters from the host and sends the parameters to the authentication server 104. For example, for wireless station 126, AP 128 sends the parameters via network 120 to WDS 110, and WDS 110 sends the parameters along network 114 to WLR 102. WLR 102 forwards the parameters to AS 104, which stores them in database 108. When station 130 is communicating with AP 118, the parameters are sent along network 120 to WDS 110, from WDS 110 along network 114 to WLR 102, from WLR 102 along network 106 to AS 104 for storage into database 108. After station 130 roams to location 136, the parameters are sent to AP 122, from AP 122 along network 126 to WDS 112, from WDS 112 on network 114 to WLR 102, from WLR 102 on network 106 to AS 104 for storage in database 108. The parameters stored in database 108 are at least one of username, network access service internet protocol address, network access service port, framed internet protocol address, calling station identifier and network access service port type.

Authentication server 104 determines whether database 108 contains conflicting entries. By conflicting entry is meant any entry that is indicative of spoofing by a user accessing network 100. Examples of conflicting entries include, but are not limited to a username, a calling station identifier and/or a framed internet protocol address that is associated with more than one of the plurality of network access devices. When a conflicting entry is found, the authentication server is configured to send a message to one or more of the network access devices coupled to a user associated with the conflicting entry. For example if wireless station 126 has an associated user name and wireless station 130 is determined to be using the same user name, authentication server 104 detects the conflict by searching entries in database 108, and upon detecting the conflict sends a message to AP 116 and/or AP 118 to take corrective action. For example, a RADIUS server can send messages as described in RFC 3576 to AP 116 and/or AP 118. The message sent by authentication server 104 can be a disconnect request and/or a change of authorization In accordance with an aspect of the present invention, the present invention is suitably adaptable to protect wired components in the network as well as wireless components. Database 108 is suitably adaptable store a field, e.g., NAS Port Type, indicating the type of connection a client (e.g., a station such as stations 128, or an infrastructure node, for example AP 116, 118, 122 124 or WDS 110 and 112) has established. For example the type of connection can be one of Ethernet, Cable, wireless, 802.11, etc. For a client that is connected to the network by a Ethernet or is cable, if it is determined via database 108 that the device has roamed, authentication server 104 can detect the roam and act accordingly.

Figure 2:
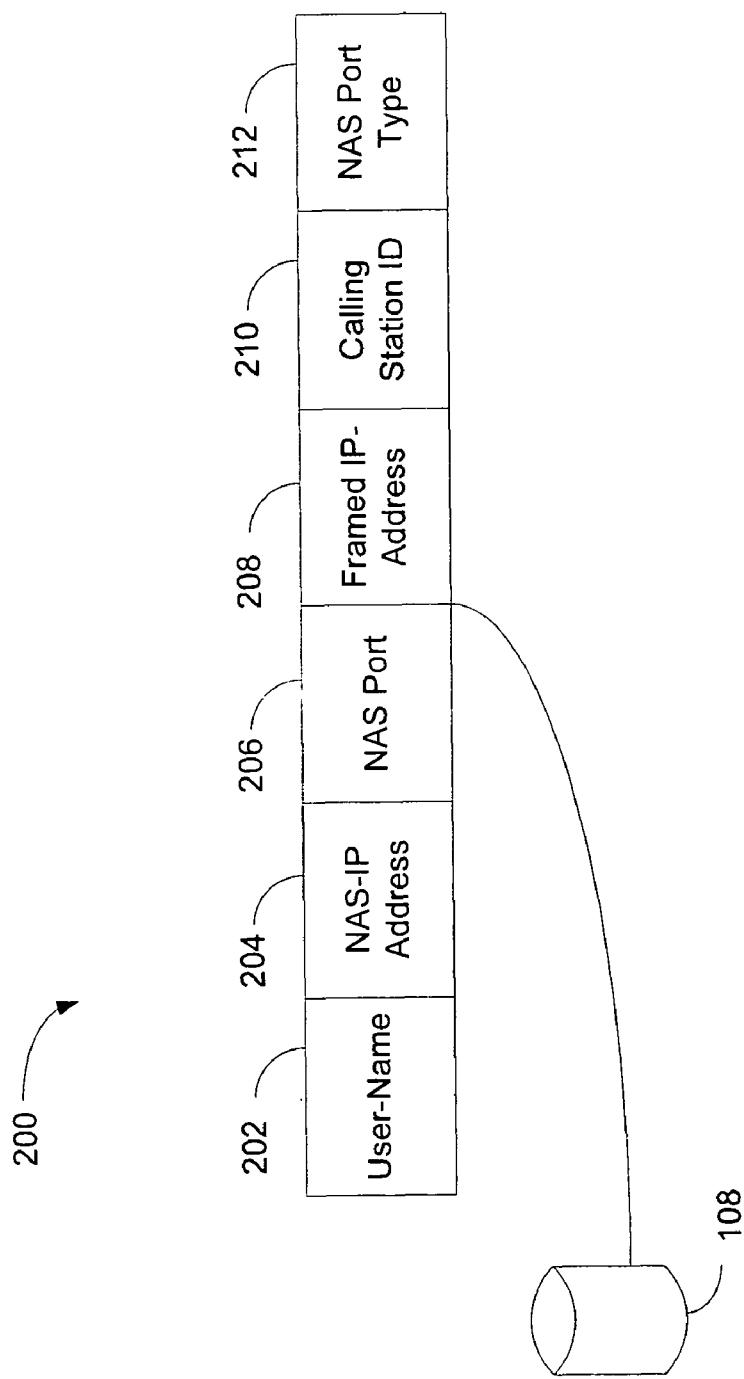
FIG. 2 is a block diagram of a common security database record in accordance with an aspect of the present invention.

FIG. 2 is a block diagram of a common security database record 200 in accordance with an aspect of the present invention. The common security database record 200 is stored in database 108 and suitably contains fields such as User-name 202, NAP-IP address 204, NAS Port 206, Framed IP-Address 208, Calling Station ID 210, and NAS Port type 212.

User-name 202 (e.g., RADIUS attribute 1) indicates the name of the user to be authenticated. It is sent in Access-Request packets if available. It may be sent in an Access-Accept packet, in which case the client should use the name returned in the Access-Accept packet in all Accounting-Request packets for this session. The user-name 202 attribute format typically includes a type, length and string. The type field is typically set to 1 to indicate a User-Name field. The length indicates the length of the field. The String field is one or more octets. The NAS may limit the maximum length of the User-Name. The format of the username may be one of several forms:

text Consisting only of UTF-8 encoded 10646 [7] characters;

network access identifier, A Network Access Identifier as described in RFC 2486; or distinguished name, a name in ASN.1 form used in Public Key authentication systems.

The NAS-IP address 204 (e.g., RADIUS attribute 4) indicates the identifying IP Address of the NAS which is requesting authentication of the user, and should be unique to the NAS within the scope of the RADIUS server. The NAS IP address 204 is the IP address of the network access device that is receiving the request from the user and is indicative of the location of the user. The NAS-IP-Address 2-4 is used in Access-Request packets. Either NAS-IP-Address 204 or NAS-Identifier are present in an Access-Request packet. The typical attribute format for a NAS-IP address 204 has a type field, a length field and an address field. The type field is set to 4 for NAS-IP-Address. The Length preferably is 6. The Address field is four octets.

NAS-Port 206 (e.g., RADIUS attribute 5) indicates the physical port number of the NAS which is authenticating the user. It is used in Access-Request packets. Note that this is using "port" in its sense of a physical connection on the NAS, not in the sense of a TCP or UDP port number. Either NAS-Port 206 or NAS-Port-Type 212 or both should be present in an Access-Request packet, if the NAS differentiates among its ports. The fields of NAS-Port 206 typically include type (normally 5 for NAS-Port), length (e.g., 6) and the value of the port number.

Framed IP-Address 208 (e.g., RADIUS attribute 8) indicates the address to be configured for the user. It may be used in Access-Accept packets. It may be used in an Access-Request packet as a hint by the NAS to the server that it would prefer that address, but the server is not required to honor the hint. The Framed-IP-Address 208 Attribute format includes type (8 for Framed-IP-Address) Length (e.g. 6) and Address. The Address field is four octets. The value 0xFFFFFFFF indicates that the NAS should allow the user to select an address (e.g. Negotiated). The value 0xFFFFFFFE indicates that the NAS should select an address for the user (e.g. Assigned from a pool of addresses kept by the NAS). Other valid values indicate that the NAS should use that value as the user's IP address.

Calling station ID 210 (e.g., RADIUS attribute 31) is indicative of the MAC address of the host. The typical format for calling station ID 210 is type (31 for Calling-Station-Id), length (>=3) and a string field containing the address, e.g., MAC address, of the host.

NAS-Port-Type 212 (e.g., RADIUS attribute 61) indicates the type of the physical port of the NAS which is authenticating the user. It can be used instead of or in addition to the NAS-Port 206 attribute. Either NAS-Port (5) or NAS-Port-Type or both should be present in an Access-Request packet, if the NAS differentiates among its ports. The NAS-Port-Type Attribute format in a preferred embodiment includes Type (61 for NAS-Port-Type), length (e.g., 6) and a value indicative of the type of connection. Some example values are in a preferred embodiment are 15 (Ethernet), 17 (Cable), 18 (Wireless—Other) and 19 (Wireless—IEEE 802.11).

Below is a list of RADIUS attributes suitable to be stored in security database 108:

| Attribute | # | Reference | Description |
|---|---|---|---|
| NAS-IP-Address | 4 | [RFC2865] | The IPv4 address of the NAS. |
| NAS-Identifier | 32 | [RFC2865] | String identifying the NAS. |
| NAS-IPv6-Address | 95 | [RFC3162] | The IPv6 address of the NAS. |
| Session identification attributes | | | |
| User-Name | 1 | [RFC2865] | The name of the user associated with the session. |
| NAS-Port | 5 | [RFC2865] | The port on which the session is terminated. |
| Framed-IP-Address | 8 | [RFC2865] | The IPv4 address associated with the session. |
| Called-Station-Id | 30 | [RFC2865] | The link address to which the session is connected. |
| Calling-Station-Id | 31 | [RFC2865] | The link address from which the session is connected. |
| Acct-Session-Id | 44 | [RFC2866] | The identifier uniquely identifying the session on the NAS. |
| Acct-Multi-Session-Id | 50 | [RFC2866] | The identifier uniquely identifying related sessions. |
| NAS-Port-Type | 61 | [RFC2865] | The type of port used. |
| NAS-Port-Id | 87 | [RFC2869] | String identifying the port where the session is. |
| Originating-Line-Info | 94 | [NASREQ] | Provides information on the characteristics of the line from which a session originated. |
| Framed-Interface-Id | 96 | [RFC3162] | The IPv6 Interface Identifier associated with the session; always sent with Framed-IPv6-Prefix. |
| Framed-IPv6-Prefix | 97 | [RFC3162] | The IPv6 prefix associated with the session, always sent with Framed-Interface-Id. |

As those skilled in the art can readily appreciate, the format of a data record 200 for common security database 138 is flexible and can be suitably adapted to the type of network being protected. The format of data record 200 can suitably comprise any combination of one or more of the aforementioned RADIUS attributes.

Figure 3:
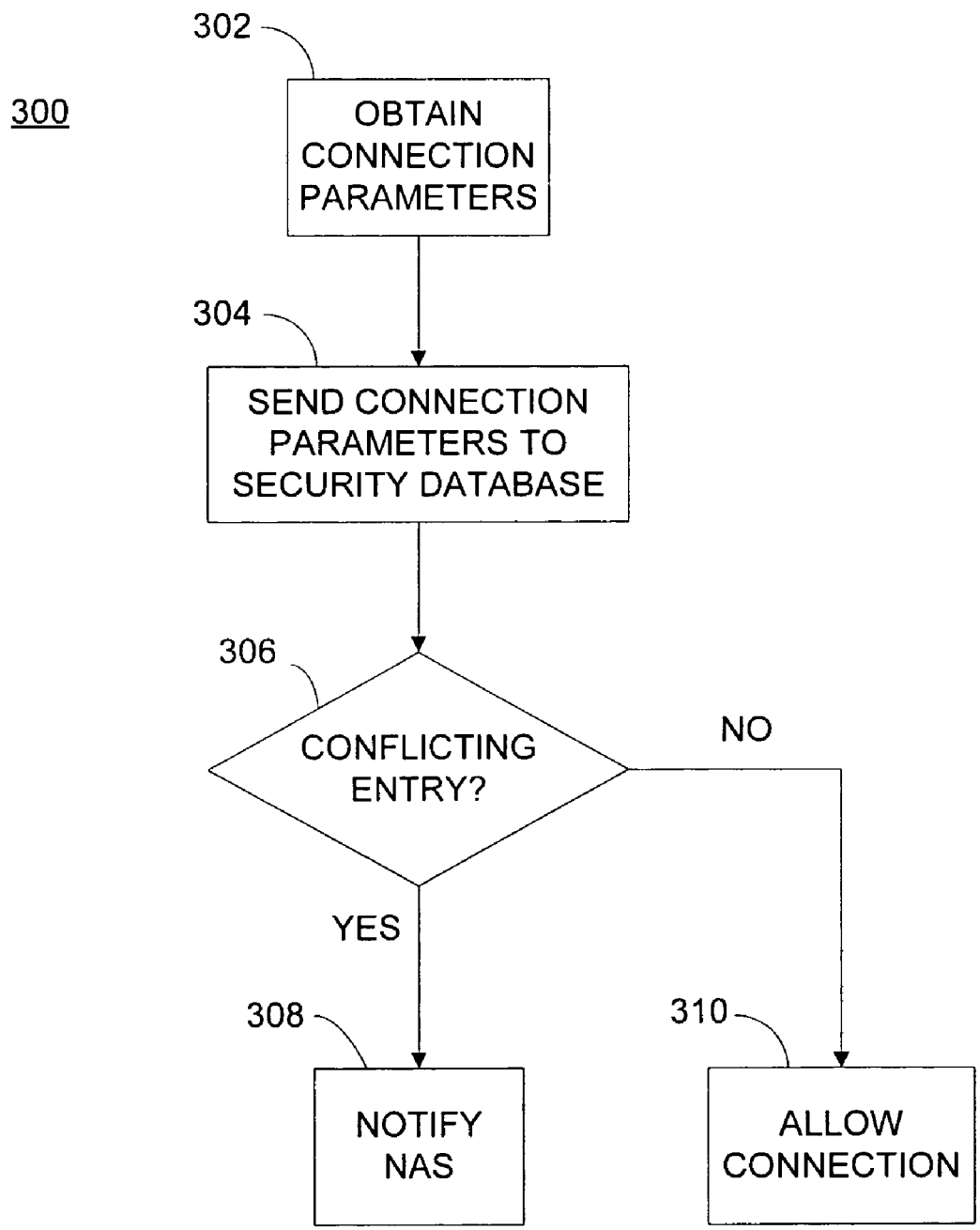
FIG. 3 is a block diagram of a method in accordance with an aspect of the present invention.

In view of the foregoing structural and functional features described above, a methodology in accordance with various aspects of the present invention will be better appreciated with reference to FIG. 3. While, for purposes of simplicity of explanation, the methodology of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 3 is a block diagram of a method 300 in accordance with an aspect of the present invention. The method provides network security using a centralized common security database.

At 302 connection parameters for a host (user) attempting to access the network from a network access device communicatively coupled to the centralized common security database are obtained. For example, for an infrastructure node, the network access device would be the next device higher in the hierarchical tree. For example, a WDS would obtain the parameters from an AP or WGB. A WLR would obtain parameters from a WDS. An AP or wireless switch would obtain the parameters for a wireless station attempting to access the network. The connection parameters are at least one of username, network access service internet protocol address, network access service port, framed internet protocol address, calling station identifier and network access service port type.

At 304 the connection parameters are sent to the security database. In at least one embodiment, the parameters are stored. At 306, the centralized common security database is then searched for a conflicting entry. For example, a conflicting entry is detected when at least one of the group consisting of username, calling station identifier and framed internet protocol address is associated with more than one network access device.

If a conflicting entry is detected at 306 (YES), then at 308 a message is sent to a at least one network access device coupled to a user associated with the conflicting entry. For example, if the conflicting entry indicates the same username is in use at two different network access devices, both devices can be notified of the conflict and can appropriate action to determine whether one or both of the connections are valid. Alternatively, both devices can sever the connection. For example, if a RADIUS server is complaint with RFC 3576, it can send a a disconnect request and/or a change of authorization to one or more of the network access devices associated with a host having a conflicted entry. If the network access service port type for a user is indicative of a wired connection, detecting that the device has roamed can generate a conflicting entry.

Figure 4:
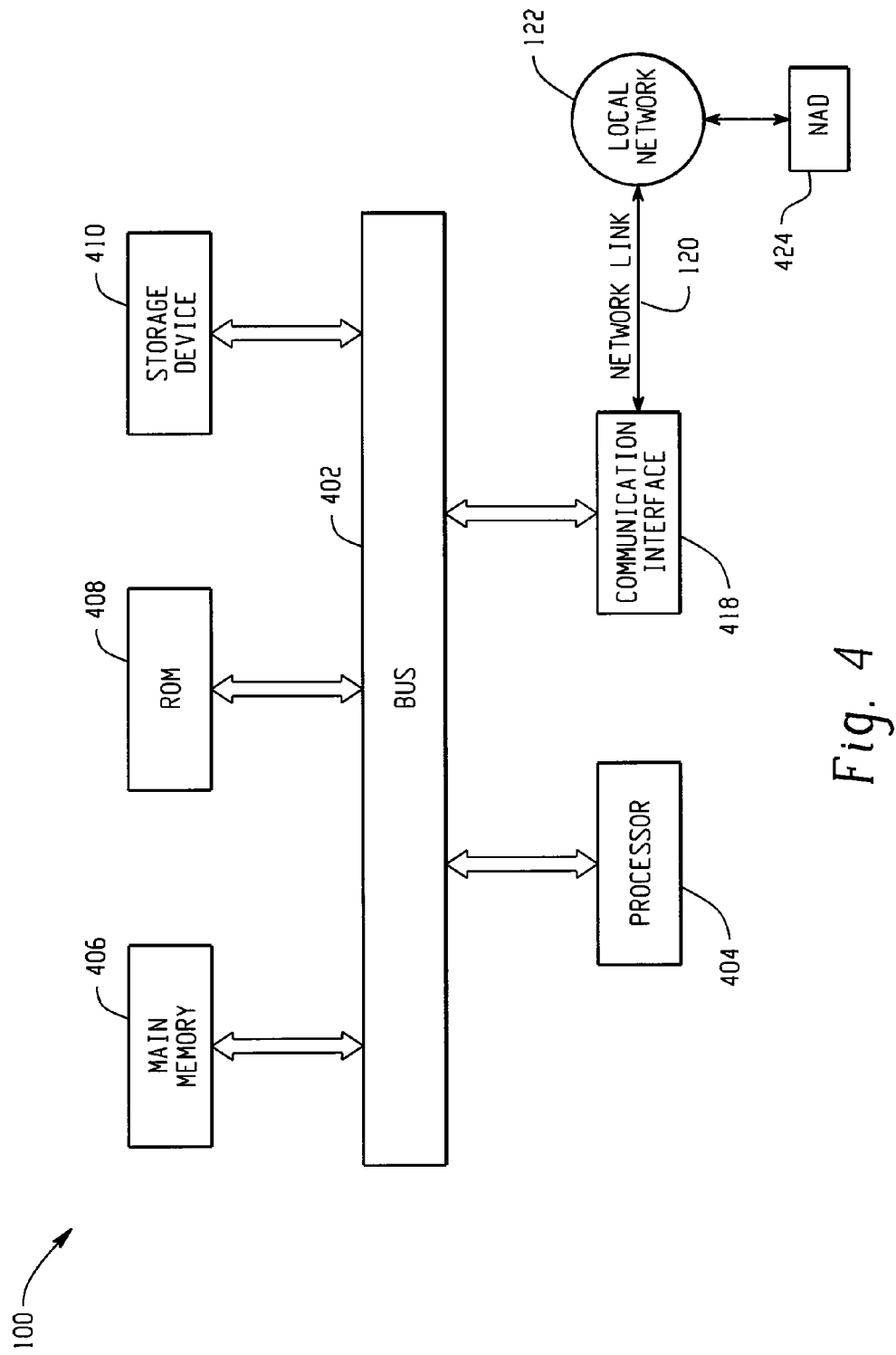
FIG. 4 is a block diagram of a computer system suitably adapted to function as an authentication server in accordance with an aspect of the present invention.

FIG. 4 is a block diagram that illustrates a computer system 400 suitably adapted to function as an authentication server, e.g., a RADIUS server, upon which an embodiment of the invention may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a ready only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the user of computer system 400 for using authentication (e.g., RADIUS) server accounting for creating a common security database. According to one embodiment of the invention, using authentication server accounting for creating a common security database is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a network access device 424. Local network 422 uses electrical, electromagnetic, or optical signals that carry the digital data to and from computer system 400, are exemplary forms of carrier waves transporting the information.

Computer system 400 can send messages and receive data, including program codes, through network link 420. In accordance with the invention, one such downloaded application provides for using authentication server accounting for creating a common security database as described herein.

The received code may be executed by processor 404 as it is received, and/or stored in storage device 410, or other non-volatile storage for later execution.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A system for providing network security by enforcing unique bindings across an associated network, the system comprising:
    a plurality of network access devices;
    an authentication server communicatively coupled with the plurality of network access devices;
    a common security database coupled with the authentication server, the common security database operative to store data representative of username, calling station identifier, framed internet protocol address, and an identifier for an associated network access device;
    wherein each of the plurality of network access devices is responsive to a request from a user to access the associated network to obtain parameters associated with user including at least a username, a calling station identifier, and a framed internet protocol address, to send the obtained parameters with an identifier for the network access device receiving the request to the authentication server;
    wherein the authentication server is responsive to receipt of the parameters from the plurality of network access devices to store the parameters and the identifier for the network access device receiving the request for reach request as common security entries in the common security database;
    wherein the authentication server is configured to detect a conflicting entry in the common security database by comparing the common security entries with the obtained parameters to determine whether at least one of the obtained parameters were previously stored in the common security database is associated with at least one of the plurality of network access devices other than the network access device receiving the request to access the associated network;
    wherein a conflicting entry is detected when at least one of the group consisting of username, calling station identifier and framed internet protocol address is associated with more than one of the plurality of network access devices;
    wherein the authentication server is configured to send a message to a one of the plurality of network access devices coupled to a user associated with the conflicting entry responsive to the authentication server detecting the conflicting entry in the common security database; and
    wherein the message is one of a group consisting of a disconnect request and a change of authorization.

2. The system of claim 1, wherein the authentication server is a RADIUS server.

3. The system of claim 1, wherein the network access service port type for a user is indicative of a wired connection, the system further comprising the authentication server configured to detect a conflicting entry for the user indicative of the user roaming.

4. The system of claim 1, wherein the parameters comprise username, network access service internet protocol address, network access service port, framed internet protocol address, calling station identifier and network access service port type.

5. The system of claim 1, wherein the authentication server is configured to notify at least one of the plurality of network access devices coupled to a user associated with the conflicting entry to take corrective action responsive to the authentication server detecting the conflicting entry in the common security database.

6. A method for providing network security across an associated network using a centralized common security database storing common security entries, the method comprising:
  obtaining from a network access device communicatively coupled with the centralized common security database at least one connection parameter associated with a user requesting access to the network, the at least one connection parameter selected from a group consisting of a username, calling station identifier and network access service port type, and an identifier for the network access device obtaining the at least one connection parameter;
  storing the obtained at least one connection parameter associated with the identifier for the network access device as an t entry in the common security database, wherein the common security database operative to store data representative of username, calling station identifier, framed internet protocol address, and an identifier for network access device obtaining the at least one connection parameter; and
  searching the centralized common security database in communication with a plurality of network access devices to determine whether a conflicting entry exists by comparing the common security entries with the at least one connection parameter to determine whether the at least one connection parameter was previously stored in the common security database in association with a network access device other than the network access device receiving the request to access the network from the user;
  sending a message to a network access device coupled to a user associated with the conflicting entry responsive to detecting the conflicting entry in the centralized common security database;
  wherein the at least one connection parameter is selected from a group consisting of username, network access service internet protocol address, network access service port, framed internet protocol address, calling station identifier and network access service port type; and
  wherein the message is one of a group consisting of a disconnect request and a change of authorization.

7. The system of claim 6, wherein a conflicting entry is detected when at least one of the group consisting of username, calling station identifier and framed internet protocol address is associated with more than one network access device.

8. The method of claim 6, wherein the network access service port type for a user is indicative of a wired connection, the detecting a conflicting entry further comprising determining a conflicting entry when a user with a network access port type indicative of a wired connection roams.

9. The system of claim 6, wherein the parameters comprise username, network access service internet protocol address, network access service port, framed internet protocol address, calling station identifier and network access service port type.

10. A non-transitory computer-readable medium storing instructions, the instructions comprising:
  means for obtaining a selected parameter for a user attempting to associate with an associated network from a network access device of a plurality of network access devices communicatively coupled with a centralized common security database, wherein the common security database operative to store data representative of username, calling station identifier, framed internet protocol address, and an identifier for an associated network access device;
  means for searching the centralized common security database responsive to the means for obtaining the selected parameter receiving a parameter from the user;
  means for determining a spoofing by the user attempting to associate with the associated network by comparing the selected parameter obtained for the user with selected parameter previously stored in the centralized common security database to determine whether the selected parameter was previously stored in the centralized common security database; and
  means for sending a message to a network access device coupled to a user associated with the conflicting entry responsive to the means for detecting a conflicting entry wherein the selected parameter is selected from a group consisting of a username of the user, a network access service internet protocol address, a network access service port, a framed internet protocol address, a calling station identifier and a network access service port type; and
  wherein the message is one of a group consisting of a disconnect request and a change of authorization.

11. The computer-readable medium storing instructions of claim 10, wherein the means for detecting a conflicting entry further comprises means for determining a conflicting entry is detected when at least one of the group consisting of username, calling station identifier and framed internet protocol address is associated with more than one network access device.

12. The computer-readable medium storing instructions of claim 10, wherein the parameters stored in the database are at least one of username, network access service internet protocol address, network access service port, framed internet protocol address, calling station identifier and network access service port type.

* * * * *

UNITED STATES PATENT AND TRADEMARK OFFICE
CERTIFICATE OF CORRECTION

| | | |
|---|---|---|
| PATENT NO. | : 7,861,076 B2 | Page 1 of 1 |
| APPLICATION NO. | : 11/020754 | |
| DATED | : December 28, 2010 | |
| INVENTOR(S) | : Ramesh V. N. Ponnapalli and Venkateshwar Pullela | |

It is certified that error appears in the above-identified patent and that said Letters Patent is hereby corrected as shown below:

Title Pg, Item (75) inventors, please replace the inventors names as follows:

--Ramesh V. N. Ponnapalli, New Tippasandra (IN); Venkateshwar Pullela, San Jose, CA (US)--

In claim 7, Column 11, starting at line 50, please replace the claim as follows:

--7. The method of claim 6, wherein a conflicting entry is detected when at least one of the group consisting of username, calling station identifier and framed internet protocol address is associated with more than one network access device.--

In claim 9, Column 12, starting at line 5, please replace the claim as follows:

--9. The method of claim 6, wherein the parameters comprise username, network access service internet protocol address, network access service port, framed internet protocol address, calling station identifier and network access service port type.--

Signed and Sealed this
Eighth Day of February, 2011

David J. Kappos
*Director of the United States Patent and Trademark Office*